(12) United States Patent
Arora

(10) Patent No.: US 10,389,971 B2
(45) Date of Patent: Aug. 20, 2019

(54) EMBEDDING VIDEO CONTENT IN PORTABLE DOCUMENT FORMAT FILES

(71) Applicant: Nautica Consulting Services Inc, Somerville, NJ (US)

(72) Inventor: Amit Kumar Arora, Princeton Junction, NJ (US)

(73) Assignee: Nautica Consulting Services Inc., Somerville, NJ (US)

( * ) Notice: Subject to any disclaimer, the term of this patent is extended or adjusted under 35 U.S.C. 154(b) by 0 days.

(21) Appl. No.: 15/785,313

(22) Filed: Oct. 16, 2017

(65) Prior Publication Data

US 2019/0068916 A1    Feb. 28, 2019

Related U.S. Application Data

(60) Provisional application No. 62/548,903, filed on Aug. 22, 2017.

(51) Int. Cl.
*H04N 7/01* (2006.01)
*G11B 20/00* (2006.01)
*H04N 1/00* (2006.01)
*H04N 21/80* (2011.01)

(52) U.S. Cl.
CPC ....... *H04N 7/013* (2013.01); *G11B 20/00007* (2013.01); *H04N 1/00* (2013.01); *H04N 7/0117* (2013.01); *H04N 21/80* (2013.01); *G11B 2020/00072* (2013.01)

(58) Field of Classification Search
CPC .......................... G11B 20/00007; H04N 7/013
See application file for complete search history.

(56) References Cited

PUBLICATIONS

B"Acrobat help/Adding multimedia to PDFs" May 12, 2014, https://helpx.adobe.com/acrobat/using/adding-multimedia-pdfs.html. Retrieved on Aug. 29, 2018.*

* cited by examiner

*Primary Examiner* — Girumsew Wendmagegn
(74) *Attorney, Agent, or Firm* — Kolisch Hartwell, P.C.

(57) ABSTRACT

A data processing system is disclosed, including one or more processors, a memory, and a plurality of instructions stored in the memory and executable by the one or more processors. The instructions may be executed to convert an input video file to a commonly used video format, and compare a resultant file size to a threshold size. In response to the file size being greater than the threshold size, the instructions may be executed to reduce a video bit rate of the input video file, and produce a Portable Document Format file that includes contents of an input Portable Document File and in which the input video file is embedded.

20 Claims, 6 Drawing Sheets

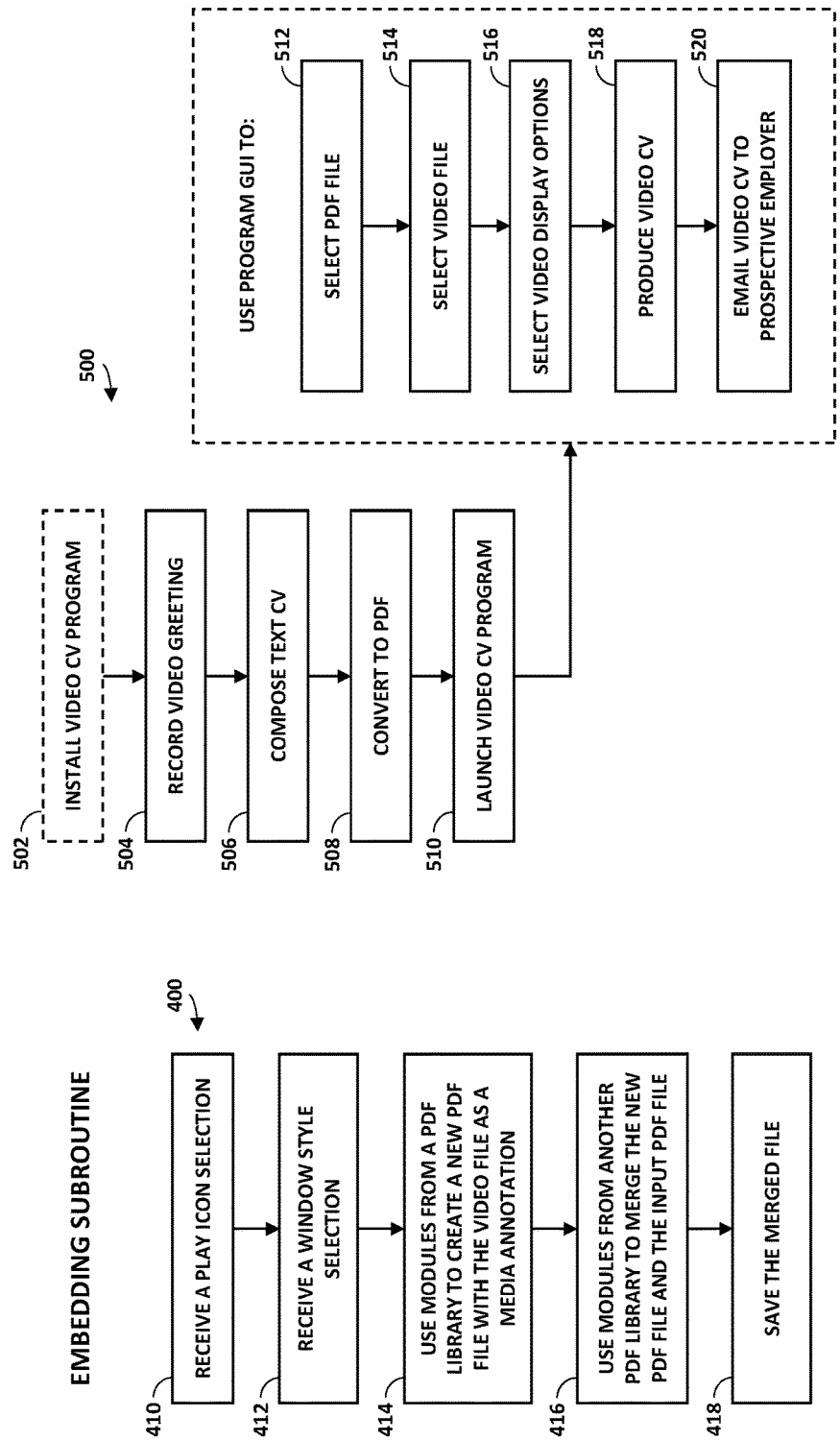

EMBEDDING VIDEO CONTENT IN PORTABLE DOCUMENT FORMAT FILES

CROSS-REFERENCES

This application claims the benefit under 35 U.S.C. § 119(e) of the priority of U.S. Provisional Patent Application Ser. No. 62/548,903, filed Aug. 22, 2017, the entirety of which is hereby incorporated by reference for all purposes.

FIELD

This disclosure relates to systems and methods for embedding video content. More specifically, the disclosed embodiments relate to embedding video in Portable Document Format files.

INTRODUCTION

Portable Document Format (PDF) files have become a key part of many types of digital information exchange. Just a few of their uses include informational brochures, emailed invoices, legal documents, and digitization of paper files. Central to their popularity and usefulness is ease of access. Unlike word processing files that require specific proprietary software to open, are incompatible across operating systems, or change formatting when opened with newer software, PDF files open easily and reliably. PDF files are also often compressible, or can be created in sizes that are quick to email or download from web pages. Once downloaded, reading a standard PDF file does not require a connection to the internet.

Typically PDF files only include text and images, and support for other media has also been introduced to the format. However, tools for adding media such as videos to PDF files are not as widely available as tools for text and images. Playing videos also requires a codec appropriate for the video format. Operating systems include media players and some codecs, but media players and which codecs they include differ between operating systems. Older systems may not have up-to-date codecs, and may require patches or updates. To view a video, a user often has to install additional software beyond a PDF reader, a process that may need to be repeated for each different video format.

Videos also generally result in large files, and when added to a PDF may exceed email file size limits or require prohibitive download times. To overcome these drawbacks, a link to a video file stored on an internet-connected server may be included in the PDF rather than the video itself. However, in that case an internet connection is required to view the video. For sensitive data, there may also be concerns regarding the security of such a connection.

Videos offer a new dimension of information for PDF files. A tool for creating video PDF files is needed, that maintains the indispensable ease-of-use of PDF for both sending and viewing files.

SUMMARY

The present disclosure provides systems, apparatuses, and methods relating to embedding video in a Portable Document Format (PDF) file. In some embodiments, a data processing system may include instructions to use a video converter tool to convert an input video file to a selected commonly used video format. Some embodiments may include further instructions to compare a resultant file size to a preselected threshold size, and in response to the file size being greater to reduce a bit rate of the input video file. In some embodiments, the system may include instructions to use a library of precompiled PDF related routines to produce an output PDF that includes contents of an input PDF and in which an input video file is embedded.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 5 is a flow chart depicting steps of an illustrative embedding subroutine of the process of FIG. 2.

FIG. 6 is a flow chart depicting steps of an illustrative method of use for a video-embedded PDF generation program comprising one or more processes taught herein.

DESCRIPTION

Figure 1:
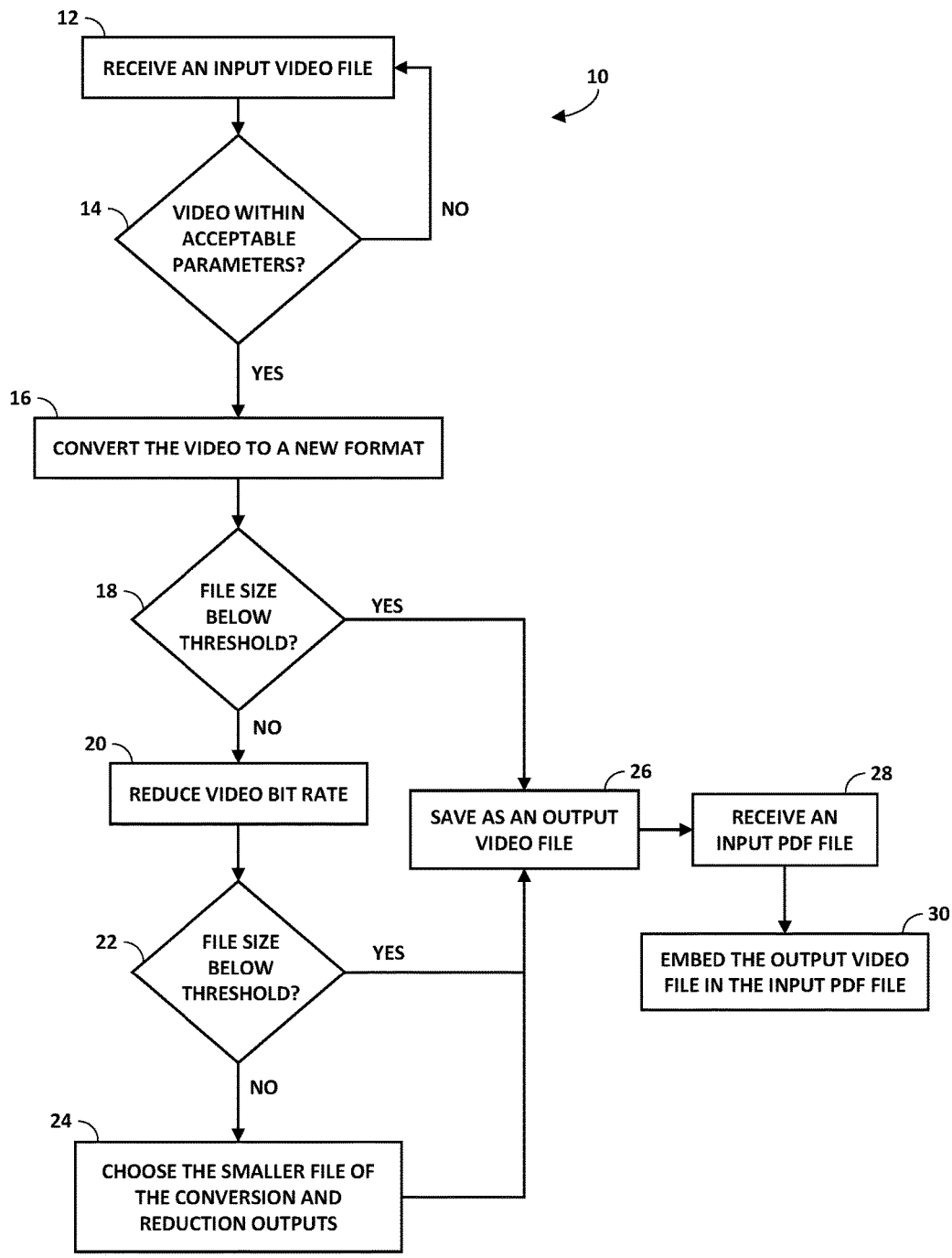
FIG. 1 is a flow chart depicting steps of an illustrative process for embedding a video in a Portable Document Format (PDF) file.

Various aspects and examples of a systems and methods for embedding video content in a Portable Document Format (PDF) file are described below and illustrated in the associated drawings. Unless otherwise specified, these systems and methods, and/or their various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

In general, programs for embedding video in a Portable Document Format (PDF) file as disclosed herein may include a user interface, one or more conversion and/or file size reduction subroutines, and an embedding subroutine. The program may also include one or more video conversion tools for use in the conversion or reduction subroutines, and may include one or more PDF related libraries of precompiled routines for use in the embedding subroutine.

Via the interface, a user selects a PDF file and a video file, which the program uses to produce a PDF file with embedded video content. The program may modify attributes of the video file such as format, bit rate, window size, and/or resolution, prior to embedding in the PDF file. The video file size may be reduced sufficiently that the file size of the produced PDF file is appropriate for email or download. The file size may also be smaller than a predetermined acceptable size or a general standard for portable or 'web-ready' file sizes.

In some examples, the video is embedded in the PDF file such that the produced PDF file is configured to be opened and the embedded video to be played by a standard PDF reader software on most common computer operating systems. The file may be configured such that the video is playable on a computer without additional installation of software, and in the absence of an internet connection.

FIG. 1 is a flow chart depicting steps of an illustrative computer-implemented method for embedding a video in a PDF file, with a sequence of operations of the program generally indicated at 10. At step 12 of method 10, the program receives an input video file from a user. The program may receive such input from the user through a graphical user interface (GUI). The user may specify a file path, save a file to a folder, upload a file, or specify or provide the input video file in any effective manner. At step 14, the program evaluates one or more properties of the input video file, which may include but are not limited to file size, playback length, resolution, and file format. The one or more properties may be evaluated against predetermined acceptable ranges or values.

If any of the one or more properties of the input video file are determined to be unacceptable, then the program may return to step 12 and prompt the user to select an alternative input video file. If all properties of the input video file are determined to be acceptable, the program may proceed to the next step.

At step 16, the program converts the input video file to a new format. The new format may be a commonly used file format compatible with a broad range of operating systems or computing platforms, and may be playable by most operating systems without additional software or updates. As part of the conversion process, the program may also alter other parameters of the video, such as resolution.

At step 18, the program compares the file size of the converted video file to a selected threshold value. In some examples the threshold value may be selectable by the user. In some examples the threshold value may be predetermined. The value may be chosen to result in a final output file that is within email file attachment size restrictions (e.g., 10 MB), or may be chosen to comply with any other standard or desired functionality.

If the converted file size is below the selected threshold value, the program proceeds directly to step 26 (see below). Otherwise, the program may continue instead with step 20, at which the video bit rate is reduced. Any suitable method(s) of bit rate reduction may be used, including sample rate conversion, intraframe compression, transcoding, and/or transrating. In some examples, the video file may be converted to another format as part of the bit rate reduction process. In such examples, the video file may then be converted once more to the commonly used file format prior to proceeding to step 22.

Step 22, similarly to step 18, includes comparing the file size of the reduced bit rate video file to the selected threshold value. If the file size is below the selected threshold value, the program may proceed directly to step 26. Otherwise, the program may continue instead with step 24, at which the file size of the converted video file and reduced bit rate file are compared. The program may store some or all changes to the input video file as temporary files in order to facilitate such comparison. The program may thereby select the temporary video file with the smaller file size.

In some examples, additional bit rate and/or file size reduction may be performed. Any number of rounds of reduction may be performed, and the resulting file size after each round may be compared to the selected threshold value. Reduction may continue until the file size is below the threshold value, until a selected number of iterations has been carried out, or until all reduction methods have been applied. In some examples, reduction may be done cumulatively. In some examples, each method may be separately performed on the converted video file produced at step 16. Resulting file sizes from each reduction method may be compared to one another to select a video file with a smallest file size. In some examples, the program may evaluate file format, file size, bit rate, and/or other video file properties to determine one or more reduction methods of a plurality of reduction methods expected to be most effective.

At step 26, the program saves the currently selected file as a temporary output video file. At step 28, the program receives an input PDF file from the user, and at step 30 the output video file is embedded in the input PDF file. Any suitable method of embedding may be used that is configured to include all video data required for playback in the PDF file. In some examples, the embedding subroutine creates a media annotation of the output video file on the input PDF file. That is, the embedding subroutine may use a PDF annotation technique to include the information of the video file in the input PDF file. The embedded video may be visually represented in the PDF file by an icon or image, a starting frame of the video, or any other suitable representation.

Aspects of video-embedded PDF generator systems described herein may be embodied as a computer method, computer system, or computer program product. Accordingly, aspects of the system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the video-embedding system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the systems described herein may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of video-embedded PDF generator systems are described herein with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary video-embedded PDF generator systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Program

As shown in FIGS. 2-5, this section describes a computer-implemented method (also referred to as a program) for embedding a video in a Portable Document Format (PDF) file, generally indicated at 110. Program 110 is another example of a program for embedding video in a PDF file, as described with respect to FIG. 1 above. FIGS. 2-5 are flowcharts illustrating steps performed in an illustrative method, and may not recite the complete process or all steps of the method. Although various steps of a method are described below and depicted, the steps need not necessarily all be performed, and in some cases may be performed simultaneously or in a different order than the order shown.

Program (e.g., software program) 110 may be installed on a computer (see Section C) with a file system, and may include third party tools such as libraries or programs. Any included third-party tools may be embedded and installed with the program. The program may be configured to be compatible with common operating systems, such as Microsoft Windows or Apple OSX.

Figure 2:
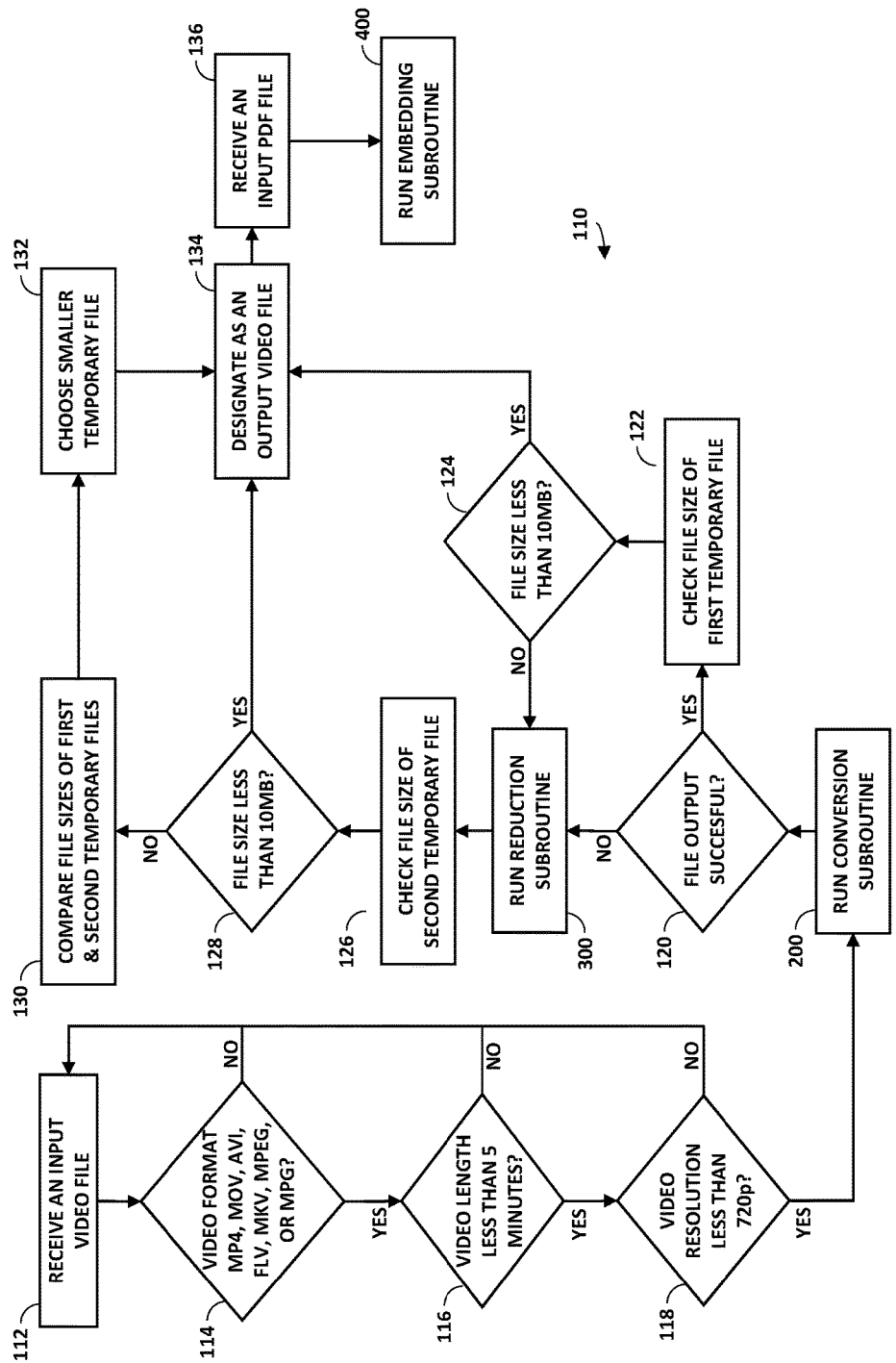
FIG. 2 is a flow chart depicting steps of another illustrative process for embedding a video in a PDF file.

FIG. 2 is a flow chart depicting operations of program 110, which begin at step 112 by receiving an input video file from a user. The user may interact with the program using a graphical user interface (GUI), or by any other suitable method. In some examples, the user may interact with the GUI in sequence with the operations of the program. In some examples, a majority of user interactions may occur before the operations of the program depicted in FIG. 2. Over the course of operations, the program may display status updates or other operational information to the user via the GUI.

The input video file may include any digital video file currently saved in the file system of the computer, or any other file system accessible by the computer. The program may interface with the file system to locate the selected input PDF file and record the file location, or file path. At step 114, the program ascertains the file format of the video and compares the format to a set of allowed formats. In the present example, allowed file formats include .MP4, .MOV, .AVI, .FLV, .MKV, .MPEG, and .MPG, although others may be suitable. The acceptable formats may be determined by what codecs are included in video converter tools used by conversion and reduction subroutines discussed below. If the video format is not acceptable, the program returns to step 112 and the user is prompted to select another input video file.

If the format of the input video file is acceptable, the program proceeds to step 116 and evaluates the length of the video, comparing the length to a selected greatest acceptable length. Any length may be used as the greatest acceptable length, and may be predetermined or may be a selectable option for the user. For example, greatest acceptable length may be a setting applied to all embedding processes and available at the time of installation or from a global settings menu. The greatest acceptable length may be selected in order to limit the possible file size of the video. In the present example, five minutes has been selected. Any other suitable maximum length may be used. If the video length is not acceptable, the program returns to step 112 and the user is prompted to select a different input video file.

If the length of the input video file is acceptable, the program proceeds to step 118 and evaluates the resolution of the video, comparing the resolution to a predetermined highest acceptable resolution. Similar to length, any suitable resolution may be used as the highest acceptable resolution, and may be predetermined or may be a selectable option for the user. In some examples, a default setting may be implemented. The highest acceptable resolution may be selected to limit the file size of the video. In the present example, a resolution of 720p has been selected. If the video resolution is not acceptable, the program returns to step 112 and the user is prompted to select a different input video file.

In some examples, the input video file may be subject to other qualifying tests and/or qualifying tests may be applied in an alternative order. In some examples, more, fewer, or no qualifying tests may be applied. If the video file is determined to be within acceptable parameters, the program passes the video file to a conversion subroutine 200. In the present example, the video file path is passed to the subroutine. In other examples, the video file may be saved to a temporary file, or may be passed to the conversion subroutine in any suitable manner. Similarly, when following steps described below, a file path may be communicated between the main program and a subroutine or a file may be passed by any effective method.

Throughout program 110 and subroutines 200, 300, and 400, information received from a user, ascertained regarding a file, or chosen by a set of operations may be stored and re-accessed or passed between the program and subroutines. The program and subroutines may save files in a temporary file folder designated by the computer's file system, or one or more folders designated or created as part of the main program installation process.

Figure 3:
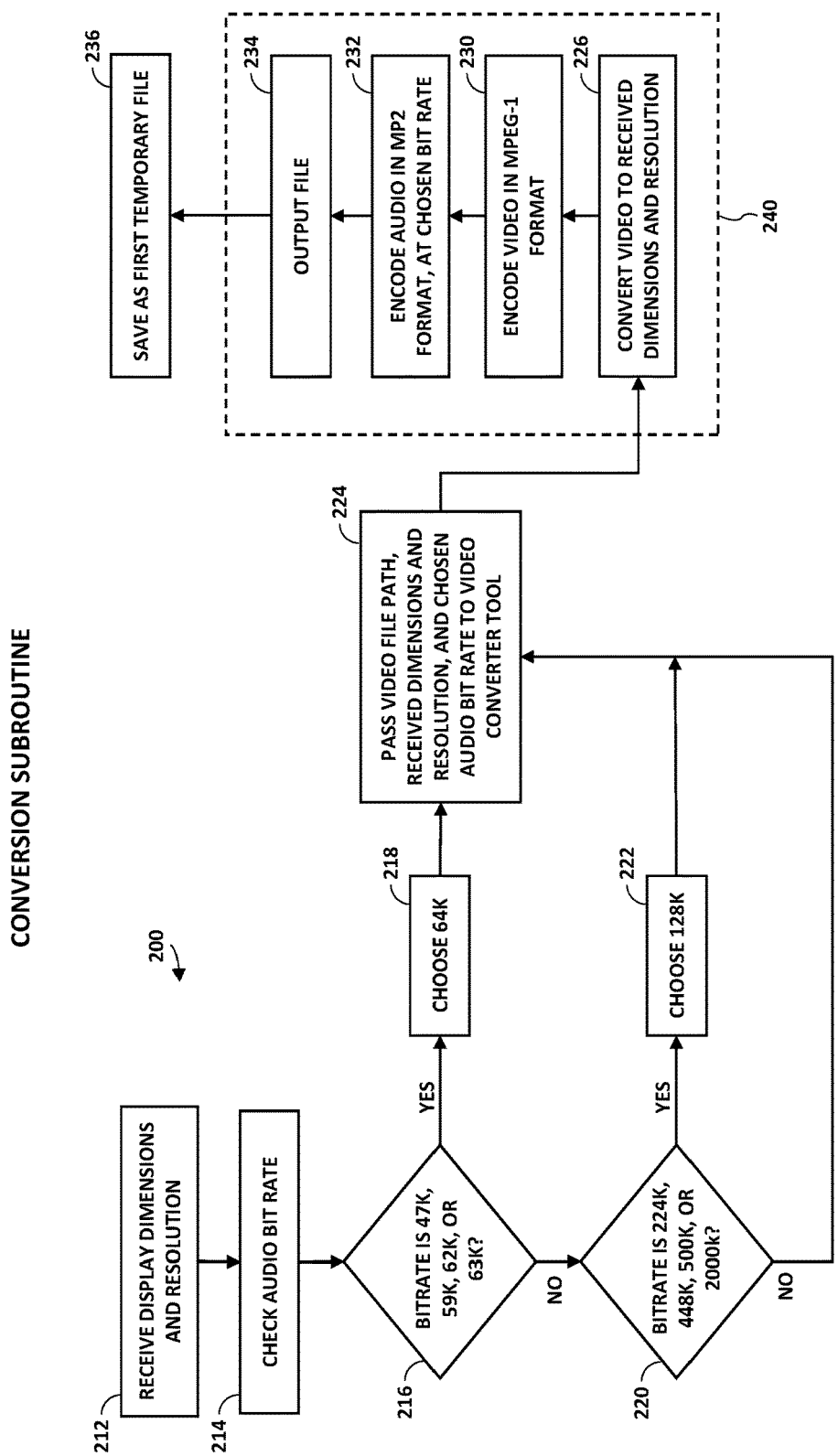
FIG. 3 is a flow chart depicting steps of an illustrative conversion subroutine of the process of FIG. 2.

FIG. 3 is a flow chart depicting steps in conversion subroutine 200. The routine first prompts the user to specify desired display dimensions and resolution for the video in the final output PDF file, which are received at step 212. In the present example, the routine provides a list of common resolution options and a set of dimension options for the user to choose from. Confining the options to a discrete set allows the routine to be constructed in a more efficient manner, and improves processing times. In some examples, the final video resolution may be a predetermined value such as 720×640 pixels. The dimensions of the video may also be set to predetermined values such as 8 by 6 centimeters. Conversion subroutine 200 may also receive appropriate video settings or option selections from the user.

At step 214, the routine ascertains the audio bit rate of the video file, and at step 216, the audio bit rate is compared to a first set of common audio bit rates. In the present example, this first set of audio bit rates includes 47K, 59K, 62K, and 63K. If the audio bit rate of the input video file matches a bit rate in the first set of audio bit rates, the routine chooses 64K as a new bit rate at step 218.

If the audio bit rate of the input video file does not match a bit rate of the first set of audio bit rates, the routine proceeds to step 220. At step 220 the routine compares the audio bit rate of the input video file to a second set of common audio bit rates. In the present example, this second set of audio bit rates includes 224 k, 448 k, 500 k, and 2,000 k. If the audio bit rate of the input video file matches a bit rate of the second set of audio bit rates, the routine chooses 128 k as a new bit rate at step 222.

If the audio bit rate of the input video file does not match a bit rate of either the first set or the second set of audio bit rates, the routine simply chooses the existing audio bit rate. Comparing the audio bit rate of the input video file to a limited number of sets of common audio bit rates allows the routine to be constructed in a more efficient manner, and improves processing times. A majority of expected audio bit rates may be represented in the first and second sets of common audio bit rates, leaving only a minority (comprising unusual bit rates) unaltered.

In the present example, the audio bit rate of the input video file is compared to two sets of common audio bit rates. In other examples, the audio bit rate of the input video file may be compared to more or fewer sets and/or sets including more or fewer audio bit rates. In some examples, the conversion subroutine may omit steps 214 through 222 and leave the audio bit rate of the input video file unaltered.

At step 224 the subroutine passes the input video file path, received selection of dimensions and resolution, and chosen audio bit rate to a multimedia data handling or video converter tool or program, indicated at 240. Any suitable converter tool may be used. In the present example, the FFMPEG command line program is used as an illustrative tool. Any program or combination of programs with equivalent functionalities may be used in place of FFMPEG, or in addition to FFMPEG. Any steps described below as performed by FFMPEG may equivalently be performed by another converter program or combination of video tools. A utilized video converter program may include a library of codecs that has any video file formats allowed for the input video file, as well as MPEG-1 or other chosen file formats. In some examples, FFMPEG or another video converter may also be used to retrieve data relating to the input video file, such as audio or video bit rates.

Subroutine 200 prepares a command or series of commands for FFMPEG, the details of which may vary depending on the choice of video converter tool. The input video file may be copied and changes made to the copy, changes may be made directly to the input video file and then saved as a separate file, or any suitable method may be used to generate an output video file from the input video file while leaving the input video file itself unchanged.

At step 226, FFMPEG is used to convert the input video file to the received selection of dimensions and resolution. At step 230, FFMPEG is used to transcode the input video to a commonly used video format, which in the present example is MPEG-1. This format is advantageous, in that the two most commonly-used computer operating systems (Windows and OS X) natively support MPEG-1. Encoding as MPEG-1 may also reduce the file size of the input video file, depending on the original file format. In the present example, no separate downsampling, compression, or other bit rate reduction is performed by the conversion subroutine. In some examples, changes to the bit rate or quality of the input video file may be made, using FFMPEG, as part of the transcoding process.

As new video formats are introduced, operating systems may cease to support MPEG-1 and transition to other formats. In such a case, subroutine 200 may be updated to instruct FFMPEG (or whatever tool is used) to encode the input video file as a newer commonly-supported video file format. Any commonly-supported format may be used. In some examples, format may be selectable (e.g., by the user) from a list of common formats.

At step 232, FFMPEG is used to encode the audio of the input video file in MP2 format, at the chosen bit rate. Similarly to the video file format MPEG-1, MP2 is widely supported, and the audio may be encoded in any commonly-supported audio format. At step 234, FFMPEG returns an output video file to conversion subroutine 200, and, at step 236, the subroutine saves the output video file as a first temporary file. The file path may then be passed back to program 110.

Referring again to FIG. 2, program 110 resumes at step 120 and checks that conversion algorithm 200 successfully outputted and saved the first temporary file. If not, the program proceeds directly to a reduction subroutine 300. Program 110 may further include such tests of successful completion of any step of the operations illustrated, or any other program operations. In the case of a failure, steps may be repeated, steps may be bypassed, or errors may be reported to the user. Those skilled in the art of programming have additional techniques of error management, and any such methods of preventing or correcting errors may be included in program 110.

If conversion subroutine 200 successfully saved the first temporary file, the program ascertains the file's size at step 122. At step 124, the program compares the file size of the first temporary file to a threshold file size. The threshold size may be any suitable size, but may be determined by a maximum allowable file size for email attachments, or other measures of a small or portable file size. In the present example, the threshold size is 10 MB. If the first output video has a file size less than 10 MB, then the program proceeds to step 134, as discussed below. If the first temporary file has a file size greater than 10 MB, then the program passes the first temporary file to a reduction subroutine 300 for further file size reduction.

Figure 4:
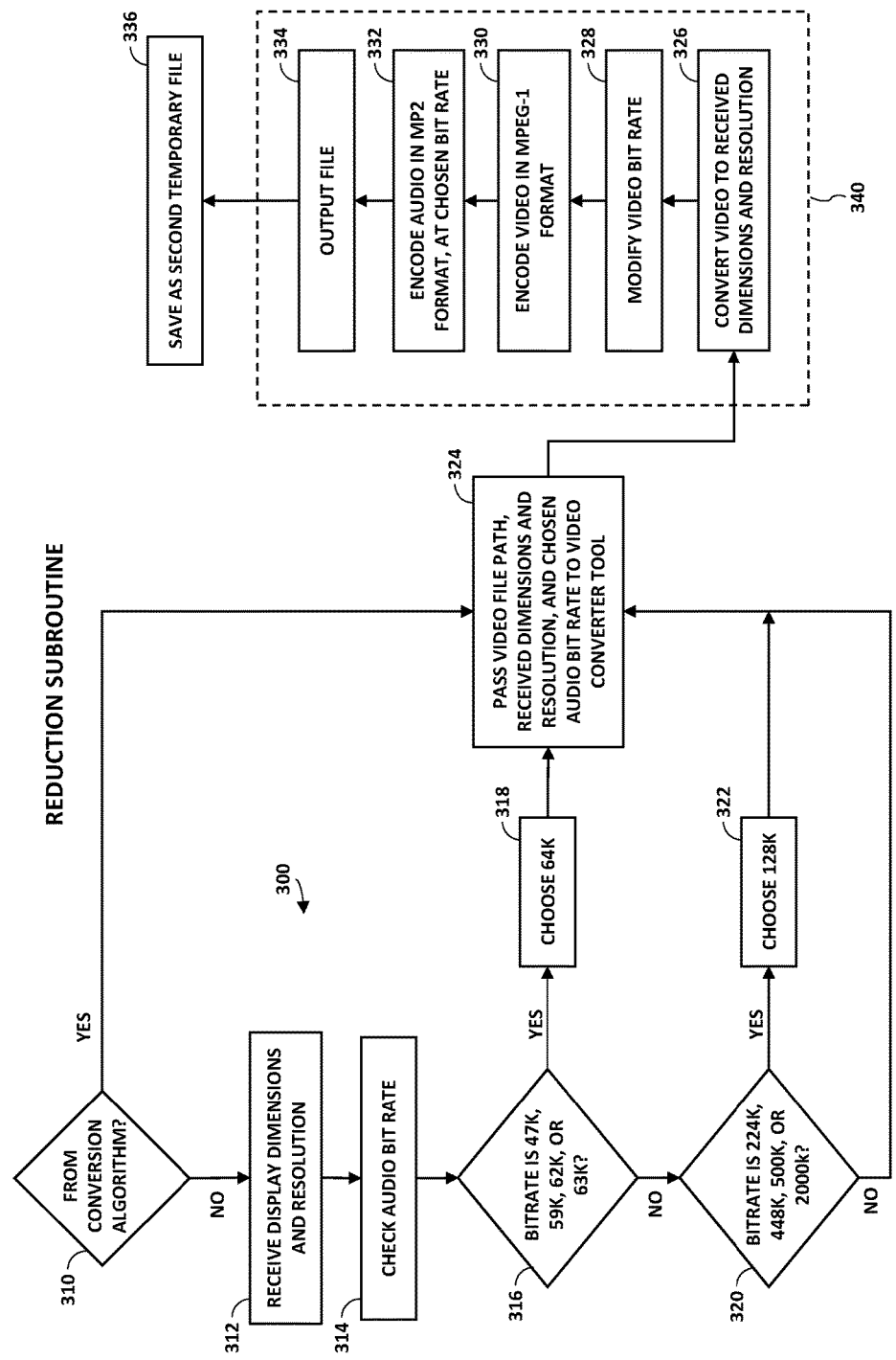
FIG. 4 is a flow chart depicting steps of an illustrative reduction subroutine of the process of FIG. 2.

FIG. 4 is a flow chart depicting steps or operations of reduction subroutine 300. The reduction subroutine receives a video file (or a file path for a video file) from main program 110. At step 310, the routine ascertains from the main program whether the received video file is the input video file that was passed directly to the reduction subroutine after an error, or instead the first temporary file that was passed on from the conversion subroutine. If the reduction subroutine receives the input video file, it first performs substantially the same steps as the conversion subroutine. Accordingly, steps of reduction subroutine 300 are numbered similarly to corresponding steps of conversion subroutine 200.

At step 312, desired display dimensions and resolution for the video in the final output PDF file are received. The values previously selected by the user may be passed to reduction subroutine 300 from conversion subroutine 200, by main program 110. At step 314 the reduction subroutine ascertains the audio bit rate of the input video file, and at step 316 the audio bit rate is compared to a first set of common audio bit rates, which in the present example include 47K, 59K, 62K, and 63K. If the audio bit rate of the input video file matches a bit rate of the first set of audio bit rates, the routine chooses 64K as a new bit rate at step 318.

If the audio bit rate of the input video file does not match a bit rate of the first set of audio bit rates, the routine proceeds to step 320. At step 320 the routine compares the audio bit rate of the input video file to a second set of common audio bit rates, which in the present example include 224K, 448K, 500K, and 2,000K. If the audio bit rate of the input video file matches a bit rate of the second set of audio bit rates, the routine chooses 128K as a new bit rate at step 322. If the audio bit rate of the input video file does not match a bit rate of the first or the second sets of audio bit rates, the routine simply chooses the existing audio bit rate.

If the reduction subroutine receives the first temporary file, the subroutine begins at step 324. The subroutine may also receive the previously selected display dimensions and resolution, and chosen audio bit rate, from the main program. From step 324, reduction subroutine 300 performs subsequent steps on the received video file irrespective of whether the file is the input video file or the first temporary file. At step 324, the subroutine passes the file path of the received video, received selection of dimensions and resolution, and chosen audio bit rate to a multimedia data handling or video converter tool or program, indicated at 340. Any suitable converter tool may be used. In the present example, the same FFMPEG command line program as in conversion subroutine 200 is used. The subroutine prepares a command or series of commands for FFMPEG, the details of which may vary depending on the choice of video converter tool.

At step 326, FFMPEG is used to convert the selected video file to the selected dimensions and resolution. Then at step 328, FFMPEG is used to reduce the video bit rate of the selected video file. The bit rate reduction may be accomplished in any effective manner. For example, FFMPEG may transcode the video file to H.264 format with a selected Constant Rate Factor (CRF) value. Such a process may set the bit rate as needed to achieve the quality specified by the CRF value. In some such examples, the CRF value may be selected by a user, either directly or as a consequence of a more general selection of a desired video quality level. In other such examples, the CRF value may be predetermined.

In another example, FFMPEG may use a two-pass Average Bit Rate (ABR) reduction method when transcoding to H.264, and directly set a selected average bit rate for the video. In some examples, the FFMPEG may be used to transrate the video instead of transcoding. Other video converter tools may offer other methods of bit rate reduction, or may use the discussed methods. Any effective method of bit rate or file size reduction may be used, including sample rate conversion, or compression by any method. A specific percentage decrease in bit rate or file size may be specified, a goal file size may be specified, and/or other specific requirements or conditions.

At step 330, FFMPEG is used to encode the selected video as the selected commonly used video format, which in the present example is MPEG-1. Then at step 332, FFMPEG is used to encode the audio of the selected video file in MP2 format, at the chosen bit rate. At step 334, FFMPEG returns an output video file to reduction subroutine 300. Finally, at step 336 the subroutine saves the output video file as a second temporary file. The file path may be passed back to program 110.

Referring again to FIG. 2, program 110 resumes at step 126 and ascertains the size of the second temporary file. At step 128, the program compares the ascertained file size to the threshold file size. As previously discussed, the threshold file size in the present example is 10 MB, although any suitable limit may be used. If the first output video has a file size less than 10 MB, then the program proceeds to step 134, as described further below.

If the second temporary file has a file size greater than 10 MB, then the program compares the file size of the first temporary file to the file size of the second temporary file, at step 130. To this end, the program may ascertain the file size of each temporary file, or may retrieve previously stored values. At step 132, the program chooses the temporary file having the smaller file size.

At step 134, the chosen temporary file is designated as an output video file. Designation of the file may include saving a copy of the chosen temporary file, naming the chosen temporary file, or the program may use the chosen temporary file as the output video file in the following steps.

The program receives an input PDF file from the user, at step 136. The input PDF file may be any PDF file currently saved in or otherwise available to the file system of the computer, e.g., a tourist brochure or a résumé. The input PDF file may include text and/or images, and may be created by any suitable method. The program may interface with the file system to locate the selected input PDF file, and record the file location, or file path. The file paths of the output video file and input PDF file are then passed to an embedding subroutine 400.

FIG. 5 is a flow chart depicting steps or operations of embedding subroutine 400. First, subroutine 400 receives further display option selections relating to a "play video" icon and a window style from the user, in steps 410 and 412 respectively. In the present example, the routine provides a list of common icons and a choice between a standard window and a floating pop-up window. Confining the options to a discrete set may allow the routine to be constructed in a more efficient manner, and improve processing times.

Other display options may also be presented to the user, such as playback control buttons, buffer margins, and/or position on the page (e.g., top or bottom). In some examples, the user may select an input image file saved in the file system of the computer to be used as the play icon. In other examples, default display settings may be preselected. For instance, a floating pop-up window may be determined to provide smoothest playback across all operating systems. Accordingly, the floating pop-up option may be preselected as a default, or may be required by the system.

At step 414, the embedding subroutine uses tools or modules of a PDF library to create a new blank PDF and add the video file as an annotation. In the present example, PDFFileWriter is used, but any library or combination of libraries having suitable functionality may be used. The annotation appears as a symbol or image in the PDF document, i.e., as the play icon. The icon may be configured to generate a window in response to a tap, a mouse button click, or other action, with the window then automatically playing the embedded video. Depending on the selected window style, the video window may be a floating pop-up window or may be anchored to the pdf page. In some examples, play or pause controls, and/or other media player functionalities may be included in the video window.

The appearance of the embedded video may be determined by the annotation tools available in the PDF library used. For example, PDFFileWriter includes tools for generation of the floating popup window. The choices offered for display settings may also be influenced by behavior of a final PDF output file in different PDF reader software or operating systems. For example, when using an OSX operating system with a floating window, mouse clicks in the body of the PDF file may be prevented from pausing the video playback. The embedding subroutine may be configured such that the generated video annotation plays smoothly across platforms.

At step 416, the program uses tools of a PDF library to access the contents of the input PDF file and the temporary PDF file, and combines them into a final output PDF file. In the present example, iTextSharp is used, but any library or combination of libraries having suitable functionality may be used. The final output PDF file may be saved in the predetermined temporary file location or may be saved in another location specified by the user.

In some examples, the embedding subroutine may embed the video directly into the input PDF rather than using an intermediary new PDF file. The number of steps, and how the steps are divided may depend on the tools available in the PDF library or libraries used. For example, the iTextSharp library includes functionality to read the contents of an existing PDF file as part of the combination process, which is not available with all such PDF libraries. Any suitable PDF libraries may be used, and the subroutine may be constructed to include or take advantage of additional functions or features of a PDF library.

Finally, program 110 may prompt the user to perform any further desired distribution of the final output file, such as saving copies or emailing the file. The final output PDF file may be configured to be opened on other computers, such that any recipient of an emailed copy, a flash drive with a saved copy, a downloaded copy, or other distribution of the file may view the video. The file may include all information necessary to play the video when opened by an appropriate PDF reader program.

B. Illustrative Method of Use

This section describes steps of an illustrative method for creating a video resume or curriculum vitae (CV); see FIG. 6. Aspects of programs, subroutines, and/or interfaces described above (e.g., programs 10 and/or 110) may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of a method 500 are described below and depicted in FIG. 6, the steps need not necessarily all be performed, and in some cases may be performed simultaneously or in a different order than the order shown.

A jobseeker or applicant for a position may seek to distinguish their resume or CV from a field of other qualified applicants. Particularly for customer service, sales or other client-facing positions, including a video introduction may allow the jobseeker to demonstrate key strengths that cannot be conveyed through written material. The jobseeker may use method 500 to produce a video CV that can be submitted to the employer via standard means, and that the employer can open and play without additional software or technical expertise.

Alternatively, an employer seeking to fill a position requiring outstanding presentation skills may wish to require resumes with video greetings in order to more accurately assess applicants. A jobseeker may then use method 500 to produce a video CV meeting the employer's requirements.

At optional first step 502, the jobseeker installs a video CV program onto a computer. The video CV program may include program 10, program 110, and/or the like. In some examples, the video CV program may include some portion of program 10 and/or program 110 embedded in another program, one or more portions of program 10 and program 110, or any such combination.

Appropriate computers may include desktop PCs, laptop computers, mobile devices, or other computer devices having hardware and software capable of executing the program. The video CV program may be available on a physical storage medium such as a CD or flash drive, or may be downloadable over the internet. The program may be configured to be installable on a majority of commonly used computing devices, and may be installable separately or as a component of other software.

In some examples, the jobseeker may skip step 502 and may instead access a computer already having the video CV program installed. For instance, the jobseeker may be provided time on a public computer at a job center or library. In other examples, the video CV program may be available as a web-based application and may not require installation.

The jobseeker may also review information regarding program input requirements, either through a graphical user interface (GUI) of the program or in accompanying documentation. For example, the jobseeker may review a list of acceptable input video formats, a maximum acceptable video length, or a maximum acceptable video resolution.

With these restrictions in mind, the jobseeker may proceed with step 504, which comprises recording a video greeting. The jobseeker may choose a camera that records in a format on the list of acceptable input video formats for the video CV program, may choose an appropriate video format setting on a camera, or may modify the video format when editing the video after recording.

The jobseeker may record the video greeting in a single take, or may use editing software to produce a composite of multiple recording sessions. Additionally, the jobseeker may restrict the length of recording, or may edit recorded footage down to a video of an acceptable length. Similarly, the jobseeker may ensure that the recorded video is of an acceptable resolution, or conforms to any other requirements of the video CV program.

Step 506 includes composing a text-based CV. The jobseeker may update an existing document, or may compose a CV directed to a specific application. The jobseeker may use word processing software or other appropriate tools to compose a CV. At step 508, the text-based CV is converted to a PDF. This conversion may be accomplished by a PDF printer function of the word processing software used by the jobseeker, or by any effective means. In some examples, the jobseeker may use software configured to allow the text-based CV to be composed as a PDF, without requiring conversion.

When composing the text-based CV, the jobseeker may plan spacing or formatting so as to accommodate the addition of a video window. In such examples, the jobseeker may plan a desired window placement, window size, window type, or other display preferences to coordinate or cooperate with the composition of the text-based CV. For example, the job seeker may present their education history in a text block restricted to a height of five inches, such that when a video window of three inches is added to the CV with desired margins, the education history may remain entirely on a front page of the CV and may not be broken across two pages.

Once the video greeting and text-based CV PDF are created and saved to the computer having an installed copy of the video CV program, the jobseeker may launch the video CV program, as in step 510. The video CV program may perform operations such as those described with respect to programs 10 and/or 110. When using the program, the jobseeker may interact with the program's GUI to provide information to the program or instruct the program to perform any and/or all operations.

At step 512, the jobseeker selects a PDF file. That is, the jobseeker may provide the program with the location of the previously created text-based CV PDF file. At step 514, the jobseeker selects a video file. Similarly, the jobseeker may provide the program with the location of the previously created video greeting file. The jobseeker may receive confirmation of the file selections from the video CV program. If unacceptable or inappropriate files are selected, the program may communicate the error to the jobseeker and prompt selection of a new file.

For example, if a jobseeker selects a video file of greater than acceptable length, the program may display a message communicating the video length and the maximum acceptable length and prompt the jobseeker to select another file. In such an example, the jobseeker may temporarily discontinue use of the video CV program in order to modify or edit the video file to a shorter length. Once the video file has been amended and re-selected, the jobseeker may proceed with method 500.

Step 516 includes selecting video display options, which may include options such as size of the video window, location on the page of the video window, window style, video display resolution, playback controls, static playback icon, or any other desired options. The jobseeker may select from a set of limited standard options, or may finely control relevant parameters. The program GUI may include functionality allowing the jobseeker to save preferred display settings for future usage, an interface allowing interactive visual placement of the video window, or other such ease-of-use features.

At step 518, the jobseeker may finalize all file selections and display options and instruct the program to produce a video CV PDF file accordingly. The video CV program may produce a video CV PDF as laid out in the above descriptions of illustrative programs 10 and 110. The video CV program may allow the jobseeker to preview the produced PDF file prior to proceeding to step 520, to review the results and correct any errors.

Step 520 includes emailing the produced video CV to a prospective employer. In some examples, the jobseeker may email the video CV from the video CV program. In other examples, the jobseeker may save the produced video CV PDF file to the computer and compose an email separately so as to include a cover letter or other supporting documents. In some examples, the employer may require that the CV be uploaded to a web-based application or otherwise communicated.

The video CV program may be configured such that the produced video CV PDF file is able to be communicated in the manner of a standard PDF file. That is, the video CV may be saved, emailed, uploaded, written to CD, or otherwise transferred. When received by the prospective employer, a hiring director may be able to open the CV file with the same software used for opening standard PDF files. The embedded video greeting may be played by the hiring director without additional installation of software, codecs, or updates thereof. In short, the video CV may function in the same manner as widely accepted text-based CV PDF files, but with the added content of a video greeting.

C. Illustrative Data Processing System

Figure 7:
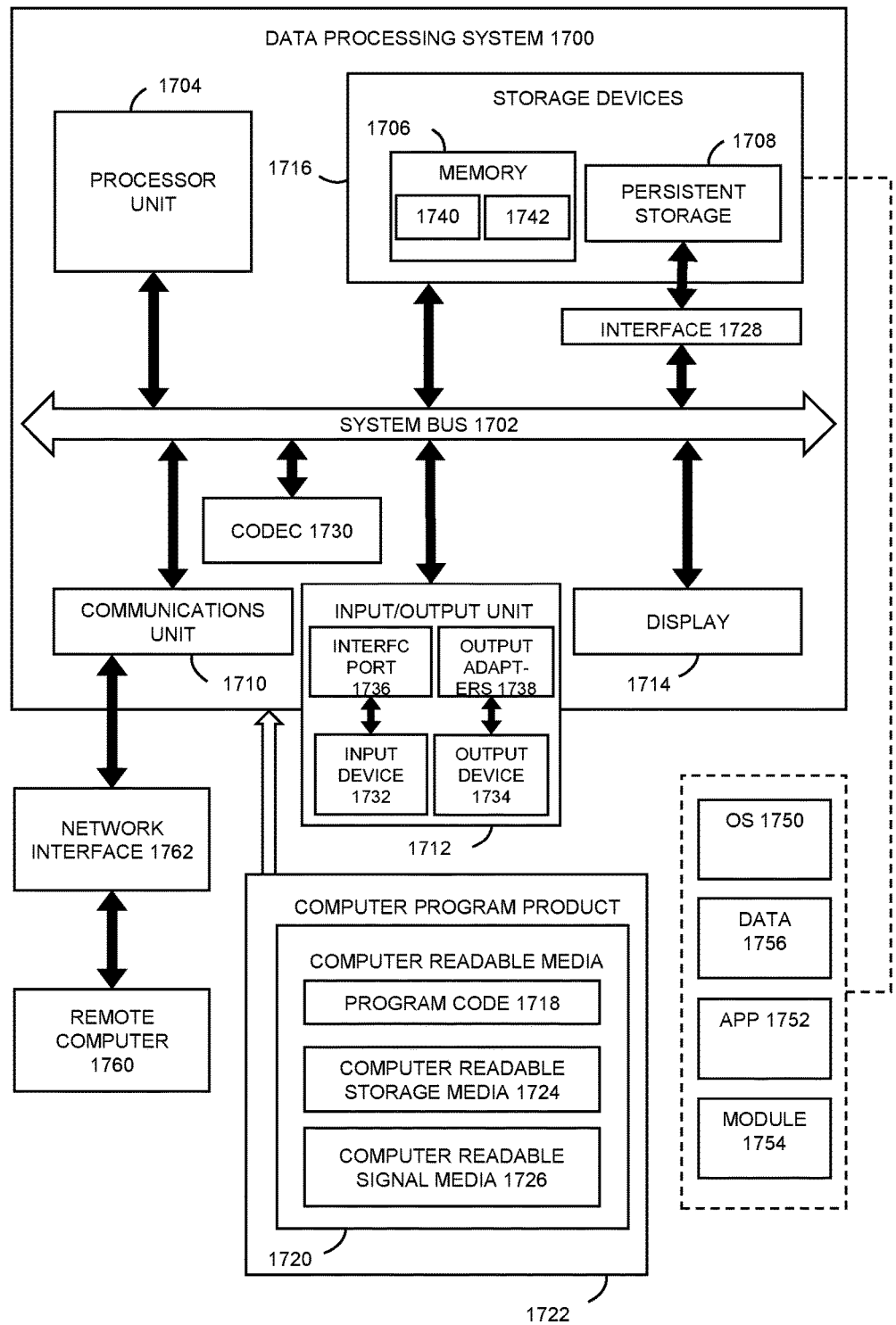
FIG. 7 is a schematic diagram of an illustrative data processing system suitable for use with aspects of the present disclosure.

As shown in FIG. 7, this example describes a data processing system 1700 (also referred to as a computer, computing system, and/or computer system) in accordance with aspects of the present disclosure. In this example, data processing system 1700 is an illustrative data processing system suitable for implementing aspects of the video-embedding PDF generator program described above. More specifically, in some examples, devices that are embodiments of data processing systems (e.g., smartphones, tablets, personal computers) may be utilized to store files, execute programs and subroutine(s) (e.g., program 110), display GUI elements, and/or communicate resulting video-embedding PDFs in accordance with aspects of the present disclosure.

In this illustrative example, data processing system 1700 includes a system bus 1702 (also referred to as communications framework). System bus 1702 may provide communications between a processor unit 1704 (also referred to as a processor or processors), a memory 1706, a persistent storage 1708, a communications unit 1710, an input/output (I/O) unit 1712, a codec 1730, and/or a display 1714. Memory 1706, persistent storage 1708, communications unit 1710, input/output (I/O) unit 1712, display 1714, and codec 1730 are examples of resources that may be accessible by processor unit 1704 via system bus 1702.

Processor unit 1704 serves to run instructions that may be loaded into memory 1706. Processor unit 1704 may comprise a number of processors, a multi-processor core, and/or a particular type of processor or processors (e.g., a central processing unit (CPU), graphics processing unit (GPU), etc.), depending on the particular implementation. Further, processor unit 1704 may be implemented using a number of heterogeneous processor systems in which a main processor is present with secondary processors on a single chip. As another illustrative example, processor unit 1704 may be a symmetric multi-processor system containing multiple processors of the same type.

Memory 1706 and persistent storage 1708 are examples of storage devices 1716. A storage device may include any suitable hardware capable of storing information (e.g., digital information), such as data, program code in functional form, and/or other suitable information, either on a temporary basis or a permanent basis.

Storage devices 1716 also may be referred to as computer-readable storage devices or computer-readable media. Memory 1706 may include a volatile storage memory 1740 and a non-volatile memory 1742. In some examples, a basic input/output system (BIOS), containing the basic routines to transfer information between elements within the data processing system 1700, such as during start-up, may be stored in non-volatile memory 1742. Persistent storage 1708 may take various forms, depending on the particular implementation.

Persistent storage 1708 may contain one or more components or devices. For example, persistent storage 1708 may include one or more devices such as a magnetic disk drive (also referred to as a hard disk drive or HDD), solid state disk (SSD), floppy disk drive, tape drive, Jaz drive, Zip drive, LS-170 drive, flash memory card, memory stick, and/or the like, or any combination of these. One or more of these devices may be removable and/or portable, e.g., a removable hard drive. Persistent storage 1708 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 1708 to system bus 1702, a removable or non-removable interface is typically used, such as interface 1728.

Input/output (I/O) unit 1712 allows for input and output of data with other devices that may be connected to data processing system 1700 (i.e., input devices and output devices). For example, input device 1732 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 1704 through system bus 1702 via interface port(s) 1736. Interface port(s) 1736 may include, for example, a serial port, a parallel port, a game port, and/or a universal serial bus (USB).

Output devices 1734 may use some of the same types of ports, and in some cases the same actual ports, as input device(s) 1732. For example, a USB port may be used to provide input to data processing system 1700 and to output information from data processing system 1700 to an output device 1734. Output adapter 1738 is provided to illustrate that there are some output devices 1734 (e.g., monitors, speakers, and printers, among others) which require special adapters. Output adapters 1738 may include, e.g. video and sounds cards that provide a means of connection between the output device 1734 and system bus 1702. Other devices and/or systems of devices may provide both input and output capabilities, such as remote computer(s) 1760. Display 1714 may include any suitable human-machine interface or other mechanism configured to display information to a user, e.g., a CRT, LED, or LCD monitor or screen, etc.

Communications unit 1710 refers to any suitable hardware and/or software employed to provide for communications with other data processing systems or devices. While communication unit 1710 is shown inside data processing system 1700, it may in some examples be at least partially external to data processing system 1700. Communications unit 1710 may include internal and external technologies, e.g., modems (including regular telephone grade modems, cable modems, and DSL modems), ISDN adapters, and/or wired and wireless Ethernet cards, hubs, routers, etc. Data processing system 1700 may operate in a networked environment, using logical connections to one or more remote computers 1760. A remote computer(s) 1760 may include a personal computer (PC), a server, a router, a network PC, a workstation, a microprocessor-based appliance, a peer device, a smart phone, a tablet, another network note, and/or the like. Remote computer(s) 1760 typically include many of the elements described relative to data processing system 1700. Remote computer(s) 1760 may be logically connected to data processing system 1700 through a network interface 1762 which is connected to data processing system 1700 via communications unit 1710. Network interface 1762 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 1730 may include an encoder, a decoder, or both, comprising hardware, software, or a combination of hardware and software. Codec 1730 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 1730 is depicted as a separate component, codec 1730 may be contained or implemented in memory, e.g., non-volatile memory 1742.

Non-volatile memory 1742 may include read only memory (ROM), programmable ROM (PROM), electrically programmable ROM (EPROM), electrically erasable programmable ROM (EEPROM), flash memory, and/or the like, or any combination of these. Volatile memory 1740 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 1716, which are in communication with processor unit 1704 through system bus 1702. In these illustrative examples, the instructions are in a functional form in persistent storage 1708. These instructions may be loaded into memory 1706 for execution by processor unit 1704. Processes of one or more embodiments of the present disclosure may be performed by processor unit 1704 using computer-implemented instructions, which may be located in a memory, such as memory 1706.

These instructions are referred to as program instructions, program code, computer usable program code, or computer-readable program code executed by a processor in processor unit 1704. The program code in the different embodiments may be embodied on different physical or computer-readable storage media, such as memory 1706 or persistent storage 1708. Program code 1718 may be located in a functional form on computer-readable media 1720 that is selectively removable and may be loaded onto or transferred to data processing system 1700 for execution by processor unit 1704. Program code 1718 and computer-readable media 1720 form computer program product 1722 in these examples. In one example, computer-readable media 1720 may comprise computer-readable storage media 1724 or computer-readable signal media 1726.

Computer-readable storage media 1724 may include, for example, an optical or magnetic disk that is inserted or placed into a drive or other device that is part of persistent storage 1708 for transfer onto a storage device, such as a hard drive, that is part of persistent storage 1708. Computer-readable storage media 1724 also may take the form of a persistent storage, such as a hard drive, a thumb drive, or a flash memory, that is connected to data processing system 1700. In some instances, computer-readable storage media 1724 may not be removable from data processing system 1700.

In these examples, computer-readable storage media 1724 is a non-transitory, physical or tangible storage device used to store program code 1718 rather than a medium that propagates or transmits program code 1718. Computer-readable storage media 1724 is also referred to as a computer-readable tangible storage device or a computer-readable physical storage device. In other words, computer-readable storage media 1724 is media that can be touched by a person.

Alternatively, program code 1718 may be transferred to data processing system 1700, e.g., remotely over a network, using computer-readable signal media 1726. Computer-readable signal media 1726 may be, for example, a propagated data signal containing program code 1718. For example, computer-readable signal media 1726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1718 may be downloaded over a network to persistent storage 1708 from another device or data processing system through computer-readable signal media 1726 for use within data processing system 1700. For instance, program code stored in a computer-readable storage medium in a server data processing system may be downloaded over a network from the server to data processing system 1700. The computer providing program code 1718 may be a server computer, a client computer, or some other device capable of storing and transmitting program code 1718.

In some examples, program code 18 may comprise be an operating system (OS) 1750. Operating system 1750, which may be stored on persistent storage 1708, controls and allocates resources of data processing system 1700. One or more applications 1752 take advantage of the operating system's management of resources via program modules 1754, and program data 1756 stored on storage devices 1716. OS 1750 may include any suitable software system configured to manage and expose hardware resources of computer 1700 for sharing and use by applications 1752. In some examples, OS 1750 provides application programming interfaces (APIs) that facilitate connection of different type of hardware and/or provide applications 1752 access to hardware and OS services. In some examples, certain applications 1752 may provide further services for use by other applications 1752, e.g., as is the case with so-called "middleware." Aspects of present disclosure may be implemented with respect to various operating systems or combinations of operating systems.

The different components illustrated for data processing system 1700 are not meant to provide architectural limitations to the manner in which different embodiments may be implemented. One or more embodiments of the present disclosure may be implemented in a data processing system that includes fewer components or includes components in addition to and/or in place of those illustrated for computer 1700. Other components shown in FIG. 7 can be varied from the examples depicted. Different embodiments may be implemented using any hardware device or system capable of running program code. As one example, data processing system 1700 may include organic components integrated with inorganic components and/or may be comprised entirely of organic components (excluding a human being). For example, a storage device may be comprised of an organic semiconductor.

In some examples, processor unit 1704 may take the form of a hardware unit having hardware circuits that are specifically manufactured or configured for a particular use, or to produce a particular outcome or progress. This type of hardware may perform operations without needing program code 1718 to be loaded into a memory from a storage device to be configured to perform the operations. For example, processor unit 1704 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 1718) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 1704 may be implemented using a combination of processors found in computers and hardware units. Processor unit 1704 may have a number of hardware units and a number of processors that are configured to run program code 1718. With this depicted example, some of the processes may be implemented in the number of hardware units, while other processes may be implemented in the number of processors.

In another example, system bus 1702 may comprise one or more buses, such as a system bus or an input/output bus. Of course, the bus system may be implemented using any suitable type of architecture that provides for a transfer of data between different components or devices attached to the bus system. System bus 1702 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 1710 may include a number of devices that transmit data, receive data, or both transmit and receive data. Communications unit 1710 may be, for example, a modem or a network adapter, two network adapters, or some combination thereof. Further, a memory may be, for example, memory 1706, or a cache, such as that found in an interface and memory controller hub that may be present in system bus 1702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

D. Additional Examples and Illustrative Combinations

This section describes additional aspects and features of systems and methods for embedding video in a Portable Document Format (PDF) file, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A data processing system for producing video-embedded PDF files, the system comprising:
  one or more processors;
  a memory;
  a plurality of instructions stored in the memory and executable by the one or more processors to:
    verify that a format of an input video file is included in a list of acceptable formats;
    verify that one or more quantitative properties of the input video file are within predetermined numerical limits;
    use a first video converter tool to modify one or more quantitative properties of the video file;
    use a second video converter tool to convert the input video file to a selected video format and store the resulting video file as a first temporary video file in the memory;
    compare a file size of the first temporary video file to a preselected threshold size;

in response to the file size being greater than the preselected threshold size, use a third video converter tool to reduce a video bit rate of the first temporary video file and store the result as a second temporary video file in the memory;

retrieve an input Portable Document Format (PDF) file stored in the memory; and produce an output PDF file that includes contents of the input PDF file and in which the second temporary video file is embedded.

A1. The data processing system of A0, wherein the one or more quantitative properties include a duration (i.e., length).

A2. The data processing system of A0, wherein the one or more quantitative properties include a resolution.

A3. The data processing system of A0, wherein the first video converter tool, the second video converter tool, and the third video converter tool are included in a single software program.

A4. The data processing system of A0, wherein the preselected threshold size is less than approximately 15 megabytes.

A5. The data processing system of A4, wherein the preselected threshold size is less than approximately 10 megabytes.

A6. The data processing system of A0, wherein the second temporary video file is embedded in the output PDF file as a media annotation.

A7. The data processing system of A6, wherein the video is embedded using one or more libraries of precompiled PDF-related routines.

A8. The data processing system of A6, wherein display settings of the media annotation are selected according to input by a user.

B0. A data processing system, comprising:
one or more processors;
a memory;
a plurality of instructions stored in the memory and executable by the one or more processors to:
determine an audio bit rate of an input video file stored in the memory;
select a new audio bit rate based on the audio bit rate of the input video file;
convert the input video file to have the new audio bit rate;
convert the input video file to a selected video format and store the resulting video file as a first temporary video file in the memory;
compare a file size of the first temporary video file to a preselected threshold size;
in response to the file size of the first temporary video file being greater than the preselected threshold size, modify a video bit rate of the first temporary video file and store the resulting video file as a second temporary video file in the memory;
compare a file size of the second temporary video file to the preselected threshold size;
in response to the file size of the second temporary video file being greater than the preselected threshold size, compare the file size of the first temporary video file to the file size of the second temporary video file;
select a smaller video file of the first temporary video file and the second temporary video file;
produce an output Portable Document Format (PDF) file that includes contents of an input PDF file and in which the selected smaller video file is embedded.

B1. The data processing system of B0, wherein the new audio bit rate is selected from a closed set of audio bit rates.

B2. The data processing system of B1, wherein each audio bit rate of the closed set of audio bit rates conforms to a respective audio standard.

B3. The data processing system of B0, wherein the preselected threshold size is less than approximately 15 megabytes.

B4. The data processing system of B4, wherein the preselected threshold size is approximately 10 megabytes.

B5. The data processing system of B0, wherein producing the output PDF file includes embedding the selected smaller video file in the output PDF file as a media annotation.

B6. The data processing system of B5, wherein the selected smaller video file is embedded using one or more libraries of precompiled PDF-related routines.

B7. The data processing system of B5, wherein display settings of the media annotation are selected according to user input.

C0. A data processing system for producing video-embedded PDF files, the system comprising:
a first set of one or more processors and a second set of one or more processors;
a first memory and a second memory;
a first plurality of instructions stored in the first memory and executable by the first set of one or more processors to:
determine an audio bit rate of an input video file stored in the first memory;
select a new audio bit rate based on the audio bit rate;
use an audio converter tool to change the audio bit rate to the new audio bit rate;
use a video converter tool to reduce a file size of the input video file and convert the input video file to a selected video format;
store the resulting video file as a temporary file in the first memory;
use one or more libraries of precompiled Portable Document Format (PDF)-related routines to produce an output PDF file that includes contents of an input PDF file and in which the temporary file is included as an embedded video; and
communicate the output PDF file to the second memory;
a second plurality of instructions stored in the second memory and executable by the second set of one or more processors to:
receive the output PDF file;
read the output PDF file; and
play the embedded video of the output PDF file.

D0. A data processing system for producing video-embedded PDF files, the system comprising:
one or more processors;
a memory;
a plurality of instructions stored in the memory and executable by the one or more processors to:
reduce the file size of an input video file;
convert the input video file to a standard video format;
embed the input video file in a Portable Document Format (PDF) file; and
produce a PDF file that is readable by a PDF reader, includes embedded video that is playable within the PDF reader, and meets a maximum file size limit.

D1. The data processing system of D0, wherein the file size limit is approximately 15 megabytes.

D2. The data processing system of D0, wherein the standard video format is MPEG-1.

D3. The data processing system of D0, wherein the PDF reader is Adobe Reader.

Advantages, Features, Benefits

The different embodiments and examples of the systems and methods for embedding video in a PDF file described herein provide several advantages over known solutions. For example, illustrative embodiments and examples described herein allow a user to easily embed any video file into any pdf document. This leads to multiple possible uses of this method, e.g., creation of video resumes.

Additionally, and among other benefits, illustrative embodiments and examples described herein embed video in such a way that it cannot be easily removed from the PDF, ensuring high level of data and content security for the user.

Additionally, and among other benefits, illustrative embodiments and examples described herein greatly reduce the file-size of the final, embedded-video PDF file, such that it is possible in most cases to transmit the video-pdf document as an attachment to an email. This means that users do not have to reply on using file-sharing methods like YouTube, Dropbox, etc. to share large files.

Additionally, and among other benefits, illustrative embodiments and examples described herein ensure that a receiver of the video-embedded PDF file does not need any specialized software to open and view the received file. For example, the received file can be opened in Adobe's standard PDF reader, and the native media player of the recipient's device is sufficient to playback the embedded video.

Additionally, and among other benefits, illustrative embodiments and examples described herein allow embedded video to be viewed in a totally offline mode, meaning without the viewer being connected to the Internet. This is a huge benefit, especially in regions where Internet service is not available, or is costly to use.

Additionally, and among other benefits, illustrative embodiments and examples described herein include a video-embedding process that does not change the file format of the PDF document to a video format. The final document format, even after a video is embedded into it, remains PDF. This is beneficial to the sender of the file, as well as the receiver, as many corporate firewalls block multimedia content from being received or sent by email for security reasons. However, by embedding multimedia content like a video file into a PDF, the firewalls do not block the transmission.

Additionally, and among other benefits, illustrative embodiments and examples described herein provide a final video-embedded PDF file that is portable and mobile, in the sense it can be stored on any storage device (e.g., a thumb drive) and transferred from one location to another.

Additionally, and among other benefits, illustrative embodiments and examples described herein ensure that the user does not need the Internet to embed the video in the PDF document. This helps make the file contents fully private and secure, in the sense that the user is not forced to use any online, third party cloud services or online servers to store user-generated content. The user remains in full control of who he or she shares the content with.

No known system or device can perform these functions, particularly in use cases such as: creation of video resumes or CVs that can be emailed or otherwise seamlessly transmitted or uploaded by candidates and received by recruiters/human resource departments; creation of video-embedded marketing collateral and product demonstrations by auto dealers and companies that can be emailed to or downloaded by potential customers via email attachments; creating video-embedded documents of rental properties by real estate companies and sharing them via email, etc. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A data processing system for producing video-embedded PDF files, the system comprising:
one or more processors;
a memory including one or more digital storage devices;
a plurality of instructions stored in the memory and executable by the one or more processors to:
reduce a file size of an input video file;
convert the input video file to a standard video format;
embed the input video file in an input Portable Document Format (PDF) file; and
produce an output PDF file that is readable by a PDF reader program, includes embedded video that is playable within the PDF reader program, and satisfies a maximum file size limit, and
the plurality of instructions being further executable by the one or more processors to:
retrieve the input PDF file from the memory,
verify that a format of the input video file is included in a list of acceptable formats,
verify that one or more quantitative properties of the input video file are within predetermined numerical limits, and
modify, using a first video converter tool, one or more quantitative properties of the video file;
wherein converting the input video file includes: using a second video converter tool to convert the input video file to a selected video format and storing a resulting video file as a first temporary video file in the memory; and
wherein reducing a file size of the input video file includes:
comparing a file size of the first temporary video file to a preselected threshold,
in response to the file size being greater than the preselected threshold, reducing a video bit rate of the first temporary video file using a third video converter tool, and
storing a resulting file as a second temporary video file in the memory; and
wherein the output PDF file includes contents of the input PDF file, and the second temporary video file is embedded in the output PDF file.

2. The data processing system of claim 1, wherein the maximum file size limit is approximately 15 megabytes.

3. The data processing system of claim 1, wherein the standard video format is MPEG-1.

4. The data processing system of claim 1, further wherein the output PDF file includes a curriculum vitae (CV).

5. The data processing system of claim 1, wherein the one or more quantitative properties include a duration.

6. The data processing system of claim 1, wherein the one or more quantitative properties include a resolution.

7. The data processing system of claim 1, wherein the first video converter tool, the second video converter tool, and the third video converter tool are included in a single software program.

8. The data processing system of claim 1, wherein the preselected threshold is less than approximately 15 megabytes.

9. The data processing system of claim 8, wherein the preselected threshold is approximately 10 megabytes.

10. The data processing system of claim 1, wherein producing the output PDF file includes embedding the second temporary video file in the output PDF file as a media annotation.

11. The data processing system of claim 10, wherein the second temporary video file is embedded using one or more libraries of precompiled PDF-related routines.

12. The data processing system of claim 10, wherein display settings of the media annotation are selected according to user input.

13. A data processing system for producing video-embedded PDF files, the system comprising:
   one or more processors;
   a memory including one or more digital storage devices;
   a plurality of instructions stored in the memory and executable by the one or more processors to:
      reduce a file size of an input video file;
      convert the input video file to a standard video format;
      embed the input video file in an input Portable Document Format (PDF) file; and
      produce an output PDF file that is readable by a PDF reader program, includes embedded video that is playable within the PDF reader program, and satisfies a maximum file size limit, and
   the plurality of instructions being further executable by the one or more processors to:
      determine an audio bit rate of an input video file stored in the memory,
      select a new audio bit rate based on the audio bit rate of the input video file, and
      convert the input video file to have the new audio bit rate,
   wherein converting the input video file includes storing a resulting video file as a first temporary video file in the memory;
   wherein reducing the file size of the input video file includes:
      comparing a file size of the first temporary video file to a preselected threshold size,
      in response to the file size of the first temporary video file being greater than the preselected threshold size, modifying a video bit rate of the first temporary video file and storing a resulting video file as a second temporary video file in the memory,
      comparing a file size of the second temporary video file to the preselected threshold size,
      in response to the file size of the second temporary video file being greater than the preselected threshold size, comparing the file size of the first temporary video file to the file size of the second temporary video file, and
      selecting a smaller video file of the first temporary video file and the second temporary video file; and
   wherein the output PDF file includes contents of the input PDF file, and the selected smaller video file is embedded in the output PDF file.

14. The data processing system of claim 13, wherein the new audio bit rate is selected from a closed set of audio bit rates.

15. The data processing system of claim 14, wherein each audio bit rate of the closed set of audio bit rates conforms to a respective audio standard.

16. The data processing system of claim 13, wherein the preselected threshold size is less than approximately 15 megabytes.

17. The data processing system of claim 16, wherein the preselected threshold size is approximately 10 megabytes.

18. The data processing system of claim 13, wherein producing the output PDF file includes embedding the selected smaller video file in the output PDF file as a media annotation.

19. The data processing system of claim 18, wherein the selected smaller video file is embedded using one or more libraries of precompiled PDF-related routines.

20. The data processing system of claim 18, wherein display settings of the media annotation are selected according to user input.

* * * * *